Patented Oct. 19, 1926.

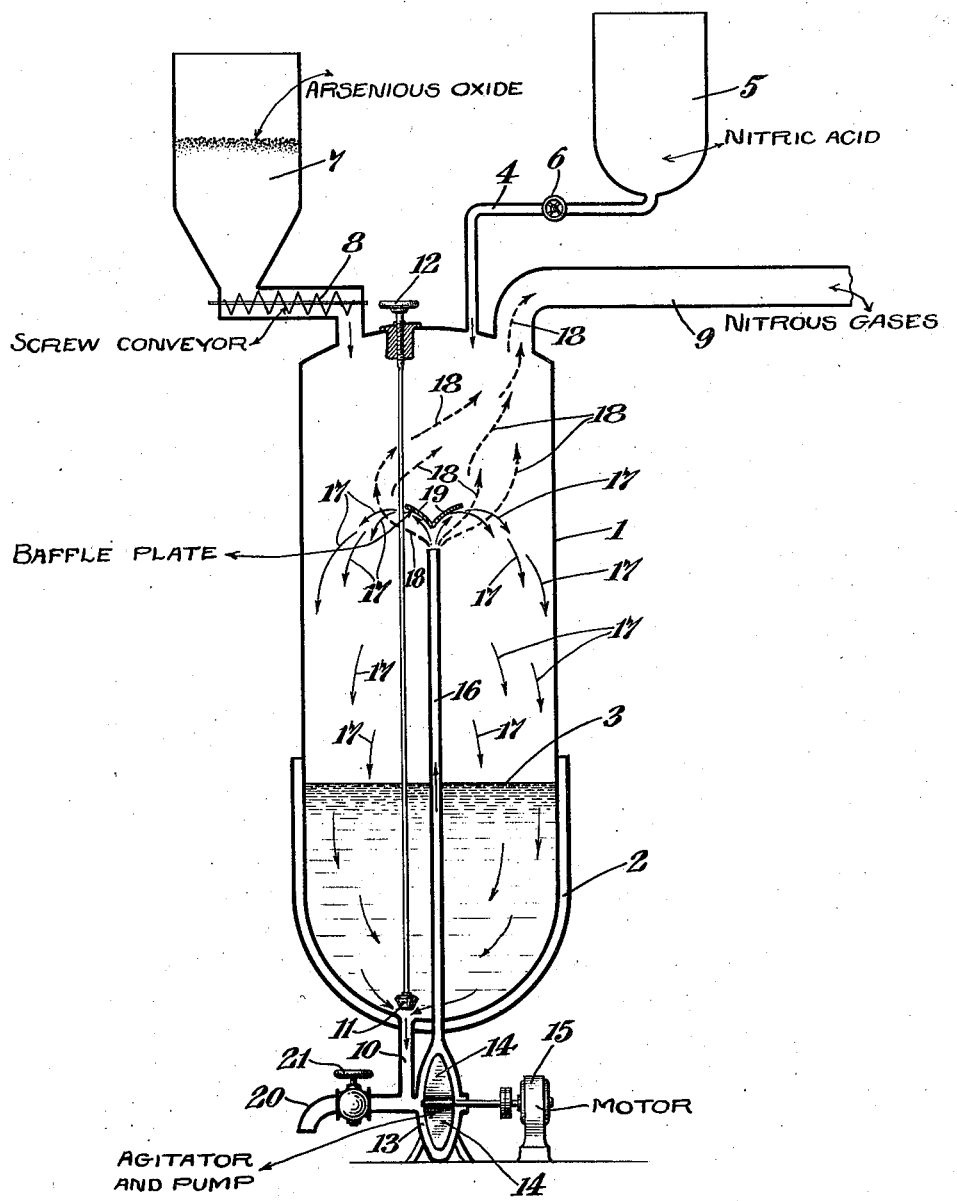

1,603,308

UNITED STATES PATENT OFFICE.

HOWARD W. AMBRUSTER, OF WESTFIELD, NEW JERSEY.

METHOD OF MAKING ARSENIC ACID.

Application filed April 9, 1925. Serial No. 21,795.

The invention relates to improvements in making arsenic acid and the like and the main object of the invention is to provide a method in which the reaction is expedited and certain disadvantages due to foaming are substantially avoided.

More specific objects, features and advantages will more clearly appear from the detailed description given below taken in connection with the accompanying drawing which forms a part of this specification. The drawing is a diagram illustrating apparatus for carrying out my improvements in a preferred form thereof.

It has been common to make arsenic acid by adding powdered arsenious oxid to a charge of nitric acid in a kettle. The reaction between the arsenious oxid and the nitric acid is usually slow and irregular, due, it is believed, to the variation in physical structure of the particles of arsenious oxid and to the impurities which commercial grades of arsenious oxid contain. In any event, great difficulty has been experienced with such mixtures because the reaction is much delayed, often until the batch has been supercharged with arsenious oxid, and there occurs an almost explosive release of gases at irregular intervals thus making the discharge and recovery of the nitrous oxid gases evolved, difficult and costly. It is found that the more impure the grade of arsenious oxid used, the more pronounced are these troubles and the reaction becomes more irregular and explosive, producing excessive frothing and increased foaming. Therefore it is belived that the impurities in the arsenious oxid not only retard the reaction by inhibiting the effect of the nitric acid on the arsenious oxid, but also these impurities assist in the formation of bubbles and in the stabilization of the froth or foam, thus often causing voluminous overflow of the kettle or reaction vessel.

It has therefore been found commercially impracticable to use arsenious oxid containing any substantial amount of impurities as the slowness and irregularity of the reaction and the formation of gas bubbles and foam made the process too costly and introduced hazards to the operators on account of the gas and foam being forcibly discharged out of the openings in the oxydizing kettles. To overcome these difficulties there have been suggested different types of kettles, the use of various chemical compounds supposed to expedite or assist in the reaction, the preheating of the batch, mechanical agitation in the kettle, the introduction of compressed air or gas, and the addition of oils, but only with partial success even with fairly pure arsenious oxid.

According to my invention however, these difficulties are substantially overcome and it is possible to commercially use low grade arsenious oxid containing excessive impurities. Also the reaction is expedited whether the grade of arsenious oxid used be good or bad, and economy in the amount of equipment required is effected and a more uniform release of nitrous gases formed is effected, thus securing a more efficient recovery thereof.

These advantages are substantially obtained by adopting the following method with the use of apparatus as indicated in the accompanying drawing.

Referring to the drawing: 1 represents a suitable kettle forming a chamber in which the arsenious oxid and nitric acid are mixed. This kettle is substantially closed to the outside atmosphere and is provided with a steam or heating jacket 2 about the lower part thereof. This jacket preferably extends to a height just above the level of the mixture 3 therein. Nitric acid of suitable strength and amount is introduced into the kettle 1 through pipe 4 from the nitric acid supply 5, by opening the valve 6. The arsenious oxid is introduced into the kettle from a suitable supply of arsenious oxid 7 by the screw conveyor 8. I prefer to use a 1000 or 1500 gallon kettle but only fill about one third or one half of the kettle with the mixture of arsenious oxid and nitric acid. The kettle is preferably circular in cross section and rounded or cone shaped at the bottom and greater in its height than in its diameter. The kettle illustrated is provided with a gas outlet pipe 9 through which the nitrous gases pass to be recovered. The bottom of the kettle is provided with an outlet 10 which may be closed at will by a valve 11 operated by the hand screw 12. The outlet 11 leads to a centrifugal pump 13 provided with suitable rotative blades 14 driven by the motor 15. The mixture which is fed to the pump through the outlet 10 is violently agitated by the rotating members in the pump and forced up through the pipe 16 which extends up through the bottom of the kettle and through the batch therein to a height considerably above the top of the batch in the kettle. The mixture which has thus been violently agitated in the chamber of the pump is thus forced out of the top of the pipe 16 in the form of a fountain whereby the material is returned to the mixture in the kettle adjacent the surface thereof by falling by gravity onto the surface of the batch in the kettle, as indicated by the arrows 17. The various parts of the apparatus should be constructed of some material not attacked by the ingredients, such as Duriron.

I preferably add the nitric acid and then add the arsenious oxid in the kettle 1 by relatively rapidly adding the oxid until the required amount has been added to form the batch. Meanwhile the valve 11 is open and the centrifugal pump in operation, whereby the pump forms a relatively small chamber to which relatively small portions of the mixture in the kettle 1 are gradually withdrawn and these small portions are violently agitated in the pump chamber and then forced up through the pipe 16 and returned to the mixture in the kettle. Thus the mixture in the kettle 1 is circulated gradually through the pump in which it is agitated and back to the kettle. By thus gradually but violently agitating the mixture in relatively small portions in a chamber separated from the main part of the bath the reaction is greatly expedited. By returning the agitated portion of the mixture to the batch over the top of the batch in the kettle as in the form of a fountain, the nitrous gases etc. formed by the reaction are readily released from the mixture as it leaves the top of the pipe 16 because it leaves the top of the pipe 16 in the form of small streams or a heavy spray which makes it easy for the gases to separate therefrom and rise away therefrom as indicated by the arrows 18. These gases are then withdrawn and recovered through the exhaust pipe 9. A baffle plate 19 may be provided above the top of the pipe 16 in order to better break up the mixture issuing from the top of the pipe 16 and also to prevent the mixture from spouting to the top of the kettle and getting in the inlet pipes and exhaust pipe 9. After the batch has thus been agitated and circulated until the reaction is complete or carried as far as desired, the pump may be stopped and the batch withdrawn through the outlet 20 by opening the valve 21.

I preferably provide a centrifugal pump of such capacity and operating at such speed that the entire batch will be circulated through the system a great many times before the reaction is completed. The outlet for the mixture in the kettle is located substantially at the lowest point in the kettle and the nitric acid and arsenious oxid pass readily to this point so that the oxid is drawn with the nitric acid into the agitating pump 13. Instead of adding the arsenious oxid directly to the kettle 1, it may be added to the batch as the latter passes through the pump or at any other point in the circulation of the batch. Likewise the nitric acid may be added gradually and at any other point in the circulation of the batch.

Since the mixture in the kettle is kept relatively quiescent, there is relatively little reaction in the kettle and therefore little frothing and relatively little foam formed therein. Such gas bubbles as are formed are formed mostly in the pump wherein the agitation and reaction largely takes place and this foam or froth is broken up as it leaves the pipe 16, the liquid portion falling by gravity back to the top of the batch in the kettle while the gases escape therefrom and rise to the exhaust pipe 19. Thus the gases are mostly released from the mixture as it leaves the top of the pipe 16 instead of being formed in the main portion of the mixture in the kettle 1, wherein they would only rise with difficulty through the batch and cause excessive foaming of the batch in the kettle.

While I have described my improvements in great detail and with respect to a preferred embodiment thereof I do not desire to be limited to such details or embodiment since many changes and modifications may be made and the invention embodied in widely different forms without departing from the spirit and scope thereof in its broader aspects. Hence I desire to cover all forms and modifications coming within the language or scope of any one or more of the appended claims.

What I claim as new and desire to secure by Letters Patent, is:—

1. The method of making arsenic acid which consists in mixing arsenious oxide with nitric acid in one chamber withdrawing the same in small portions to another chamber, agitating said portions in the second chamber, and returning them to the mixture in the first chamber.

2. The method of making arsenic acid which consists in mixing arsenious oxide with nitric acid in one chamber, withdrawing the same in small portions to another chamber, agitating said portions in the second chamber and returning them to the mixture adjacent the surface thereof.

3. The method of making arsenic acid which consists in mixing arsenious oxide with nitric acid in one chamber, withdrawing the same in small portions to another chamber, agitating said portions in the second chamber and returning them to the mixture in the first chamber in the form of a fountain which causes them to fall by gravity on to the surface of the mixture in the first chamber.

4. The method of making arsenic acid which consists in mixing arsenious oxide with nitric acid in one chamber, and circulating the mixture gradually through another chamber and back to the mixture in the first chamber while agitating the mixture in the second chamber.

5. The method of making arsenic acid which consists in mixing arsenious oxide with nitric acid in one chamber, and circulating the mixture gradually through another chamber and back to the mixture in the first chamber while violently agitating the mixture in the second chamber, the agitated portions being returned to the mixture in the first chamber adjacent the surface of the mixture therein and the amount agitated in the second chamber at any one time being a relatively small amount of the total mixture.

6. The method of making arsenic acid which consists in mixing arsenious oxide with nitric acid in one chamber, and circulating the mixture gradually through another chamber and back to the mixture in the first chamber while agitating the mixture in the second chamber, the agitated portions being returned to the mixture in the first chamber in the form of a fountain which causes them to fall by gravity on to the surface of the mixture in the first chamber and the amount agitated in the second chamber at any one time being a relatively small proportion of the total mixture.

7. The method of making arsenic acid which consists in providing a mixture of arsenious oxide and nitric acid in one chamber, circulating the mixture gradually therefrom through another chamber, violently agitating the mixture as it passes through the second chamber, and gradually returning the agitated mixture to the first chamber over the mixture therein.

8. The method of making arsenic acid which consists in providing a relatively quiescent mixture of arsenious oxide and nitric acid in one chamber, circulating the mixture gradually therefrom through another chamber, violently agitating the mixture as it passes through the second chamber, and gradually returning the agitated mixture to the first chamber in the form of a fountain above the batch in the first chamber whereby the gases liberated in the agitated portions are effectively released in the first chamber.

9. The method of forming a chemical compound in which foaming tends to be produced, which consists in providing a mixture in one chamber, and circulating the mixture in relatively small portions through another chamber, agitating the mixture in the second chamber and gradually returning the agitated portions to the mixture in the first chamber, in the form of an upwardly directed fountain above the batch in the first chamber whereby the gases liberated in the agitated portions are effectively released in the first chamber the amount agitated in the second chamber at any one time being a relatively small part of the total mixture.

10. The method of making arsenic acid which consists in providing a relatively quiescent mixture of arsenious oxide and nitric acid in one chamber, withdrawing the same gradually to another chamber, violently agitating the portions so withdrawn in the second chamber, and returning them to the mixture in the first chamber.

11. The method of making arsenic acid which consists in providing a relatively quiescent mixture of arsenious oxide and nitric acid in one chamber, withdrawing the same gradually to another chamber, violently agitating the portions so withdrawn in the second chamber, and returning them to the top of the mixture in the first chamber.

12. The method of making arsenic acid which consists in providing a mixture of arsenious oxid and nitric acid, circulating the same through two chambers, in one of which the batch is kept relatively quiescent and in the other of which the batch is agitated, the agitated portions being returned to the batch in the first chamber.

13. The method of making arsenic acid which consists in feeding arsenious oxid and nitric acid gradually to a chamber in which they are violently agitated while gradually removing the agitated batch to another chamber.

14. The method of making arsenic acid which consists in feeding arsenious oxid and nitric acid gradually to a chamber in which they are violently agitated while gradually removing the agitated batch to another chamber, the same being delivered to the second chamber in the form of a fountain whereby the gases formed are effectively liberated.

15. The method of making arsenic acid which consists in feeding arsenious oxid and nitric acid gradually to a chamber in which they are violently agitated while gradually removing the agitated batch to another chamber, the same being delivered to the second chamber above the surface of the batch therein.

In testimony whereof I have signed my name to this specification.

HOWARD W. AMBRUSTER.